United States Patent
Duva

(10) Patent No.: US 6,627,509 B2
(45) Date of Patent: Sep. 30, 2003

(54) SURFACE FLASHOVER RESISTANT CAPACITORS AND METHOD FOR PRODUCING SAME

(75) Inventor: Frank A. Duva, Carlsbad, CA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/994,328

(22) Filed: Nov. 26, 2001

(65) Prior Publication Data

US 2003/0099084 A1 May 29, 2003

(51) Int. Cl.⁷ .............................................. H01L 21/76
(52) U.S. Cl. ...................... 438/400; 438/381; 438/382; 438/393; 438/396; 438/404; 361/321
(58) Field of Search ................................. 438/400, 381, 438/382, 393, 396, 404; 361/321

(56) References Cited

U.S. PATENT DOCUMENTS

| | | | |
|---|---|---|---|
| 3,333,169 A | 7/1967 | Valley | 317/258 |
| 3,397,085 A | 8/1968 | Cariou et al. | 117/217 |
| 3,676,754 A | 7/1972 | Maserjian et al. | 317/230 |
| 4,500,562 A | 2/1985 | Jahn et al. | 427/27 |
| 4,700,457 A * | 10/1987 | Matsukawa | 437/52 |
| 5,424,097 A | 6/1995 | Olson et al. | 427/255.5 |
| 5,534,068 A | 7/1996 | Beach et al. | 118/719 |
| 5,536,319 A | 7/1996 | Wary et al. | 118/719 |
| 5,536,321 A | 7/1996 | Olsen et al. | 118/719 |
| 5,536,322 A | 7/1996 | Wary et al. | 118/719 |
| 5,538,758 A | 7/1996 | Beach et al. | 427/255.6 |
| 5,556,473 A | 9/1996 | Olson et al. | 118/719 |
| 5,561,004 A | 10/1996 | Bates et al. | 429/162 |
| 5,583,359 A * | 12/1996 | Ng et al. | 257/306 |
| 5,641,358 A | 6/1997 | Stewart | 118/715 |
| 5,656,830 A | 8/1997 | Zechman | 257/784 |
| 5,709,753 A | 1/1998 | Olson et al. | 118/719 |
| 5,888,590 A * | 3/1999 | Gerber et al. | 427/459 |
| 5,908,506 A | 6/1999 | Olson et al. | 118/708 |
| 6,021,582 A | 2/2000 | Wing | 34/576 |
| 6,068,782 A | 5/2000 | Brandt et al. | 216/17 |
| 6,138,349 A | 10/2000 | Vinciarelli et al. | 29/841 |
| 6,381,117 B1 | 4/2002 | Nakagawa et al. | |
| 2001/0021086 A1 | 9/2001 | Shizuno et al.. | |

FOREIGN PATENT DOCUMENTS

JP          3-278511          12/1991

* cited by examiner

Primary Examiner—Son T. Dinh
Assistant Examiner—Pho M. Luu
(74) Attorney, Agent, or Firm—Christie, Parker & Hale, LLP

(57) ABSTRACT

A surface flashover resistant multilayer ceramic capacitor. The capacitor has a plurality of layers of the dielectric material and a plurality of electrodes disposed between the layers of dielectric material. The end caps are located at the end of the capacitor and connected to the internal electrodes. A coating of an insulative layer is applied to the outer surface of the capacitor and selected portions of the coating are subsequently removed. The insulative layer coating is a polymer, and specifically a poly-para-xylylene. The insulative layer is applied through a vapor deposition process. The selected portions of the insulative layer are removed by laser ablation.

10 Claims, 2 Drawing Sheets

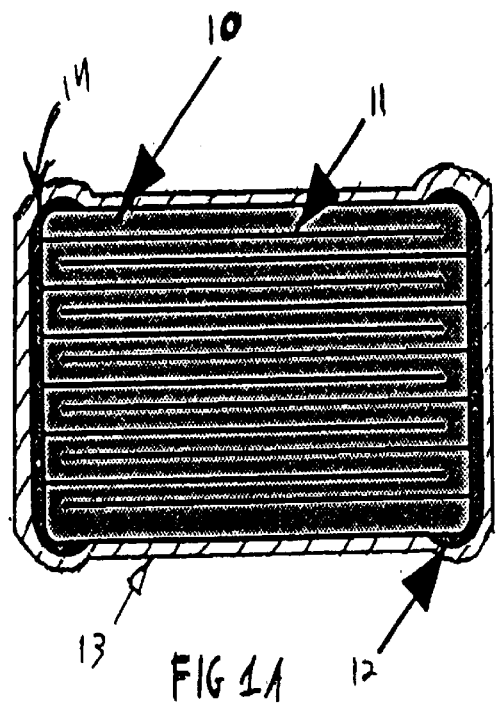
FIG 1A
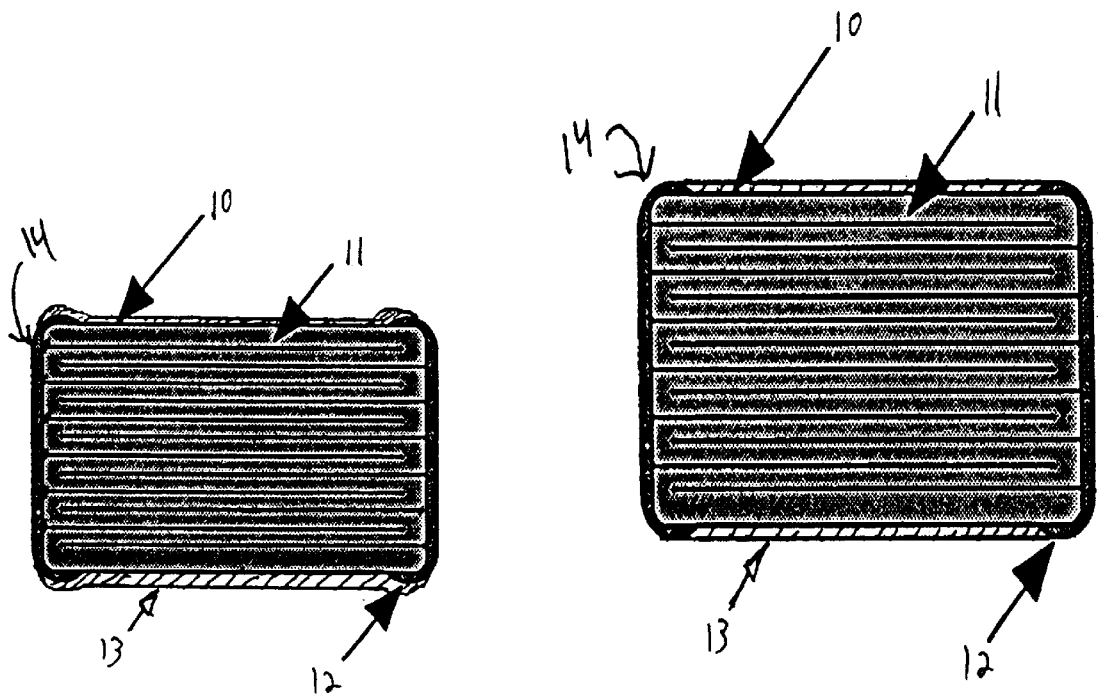
FIG. 1B
FIG. 1C

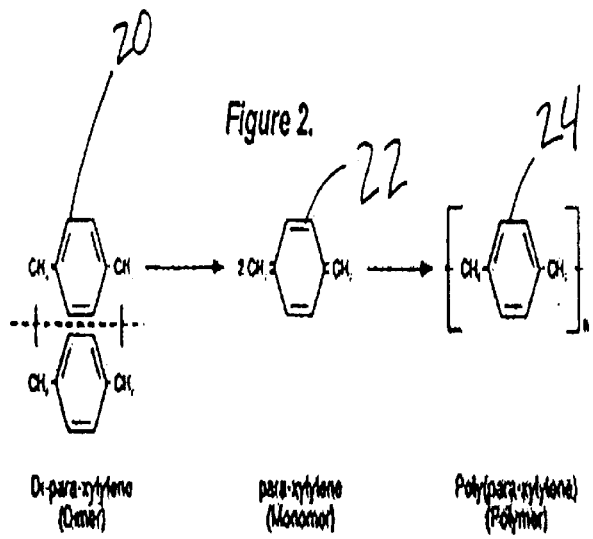
Figure 2.
Di-para-xylene (Dimer) → para-xylylene (Monomer) → Poly(para-xylylene) (Polymer)
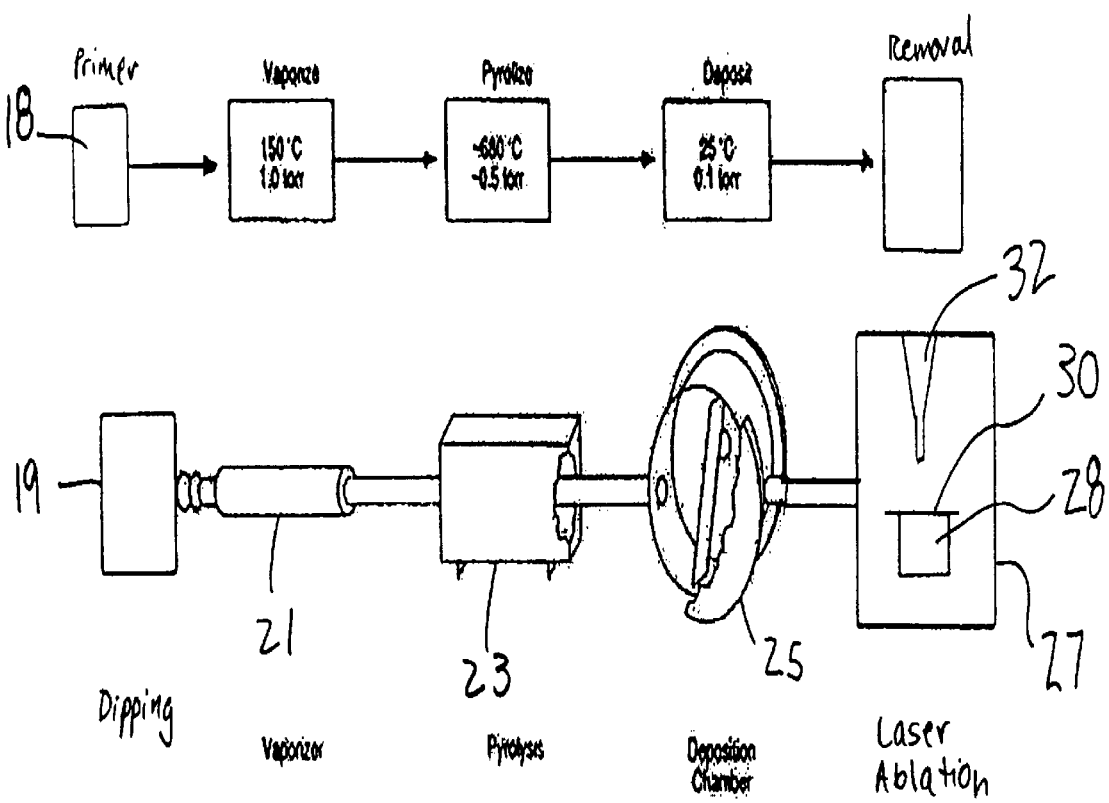

SURFACE FLASHOVER RESISTANT CAPACITORS AND METHOD FOR PRODUCING SAME

FIELD OF THE INVENTION

The present invention relates to electrical capacitors and more particularly to improved ceramic capacitors able to withstand surface flashover and a method for the manufacture of these devices.

BACKGROUND OF THE INVENTION

Ceramic capacitor technology covers a wide range of product types based on a multitude of dielectric materials and physical configurations. Regardless of the particular composition of a capacitor, all such devices are capable of storing electrical energy and find many applications in the field of electronics including: discharging stored energy, blocking direct current, coupling AC circuit components, bypassing AC signals, discriminating among frequencies, suppressing transient voltages, etc.

Multilayer ceramic capacitors are available in two general configurations. They are sold as bare leadless (chip) components, or encapsulated leaded devices. Traditionally, the chip version has been used in densely packed hybrid and delay line circuits, while the leaded capacitor has dominated the high volume printed circuit board market, which is tooled for the automatic insertion of axial or radial lead components of all types. The need for higher packing densities of components on printed circuit boards led to the development of surface mount technology which involves high speed automatic placement of leadless components. Components destined for surface mount are usually packed in tape and reel format and subsequently fed into placement machines that remove individual components from the tape and tack them to the surface of the printed circuit board with a non-conductive epoxy. Subsequent electrical attachment to conductive sites on the printed circuit board is typically accomplished with traditional solder wave processing. The greatly expanded use of surface mount technology has dramatically increased the importance of the physical size of surface mount components, such as multilayer ceramic chip capacitors. Smaller components yield higher component densities on the printed circuit boards and in turn smaller electronic devices. Thus, reducing the size of surface mount components is of great import.

The body of a multilayer ceramic capacitor is composed of alternating layers of ceramic dielectric material and conductive electrodes. The chip version of the device is completed by the addition of a pair of external conductive end caps or terminals placed at opposite ends of the body of the device. The leaded version of the device begins with the same multilayer ceramic and metal composite body as the chip version of the component but is completed by the addition of a pair of protruding conductive leads attached to opposite ends of the body and a nonconductive layer. The nonconductive layer is applied to the entire external surface of the body and leads with the exception of those portions of the leads which extend beyond the body (see e.g., U.S. Pat. No. 5,888,590).

Surface flashover is a common problem associated with ceramic chip capacitors. It represents a failure of the component and may destroy the component itself or damage electronic equipment of which the component is a part. Surface flashover is characterized by an electrical arc between the metal end caps that travels across the external surface of the outermost layer of ceramic dielectric material. The distance between the metal end caps and the voltage across the capacitor are the dominant factors in determining whether surface flashover will occur. Some other characteristics of the capacitor that may affect the size/voltage level at which surface flashover will occur include: surface contamination, properties inherent to the ceramic dielectric material, and polarization within the ceramic dielectric material. Although insulative coatings could help to alleviate surface flashover, known applications are relatively bulky in comparison to the size of ceramic chip capacitors and may impede the ability of placement machines to handle such parts during high-speed surface mount operations. Additionally, the conductive end caps of multilayer ceramic chip capacitors must be exposed in order for them to be attached by soldering to a printed circuit board. Preventing the coating of these end caps while facilitating the coating of the remainder of the chip capacitor is difficult given the nature of current capacitor coating application processes and the relatively small size of the end caps that must remain free of the coating material.

"Parylene" is a general term used to describe a class of poly-para-xylylenes which are derived from a dimer having the structure:

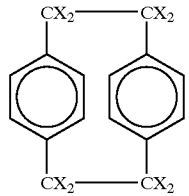

wherein X is typically hydrogen or a halogen. Common forms of parylene dimers include the following:

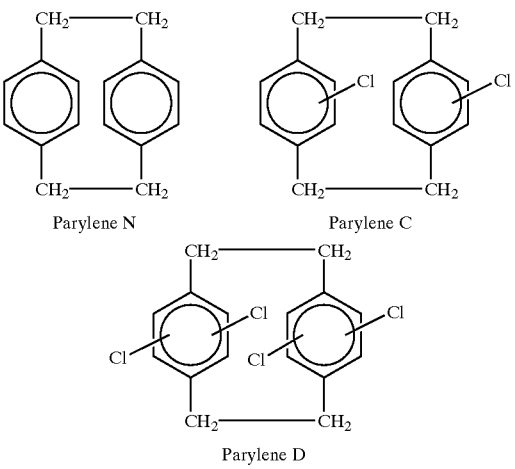

Parylene N          Parylene C

Parylene D

Parylene films are formed from their related dimers by means of a well-known vapor deposition process in which the dimer is vaporized, pyrolized and passed into a deposition chamber, wherein the monomer molecules deposit and polymerize onto the contents of the deposition chamber according to the following reaction:

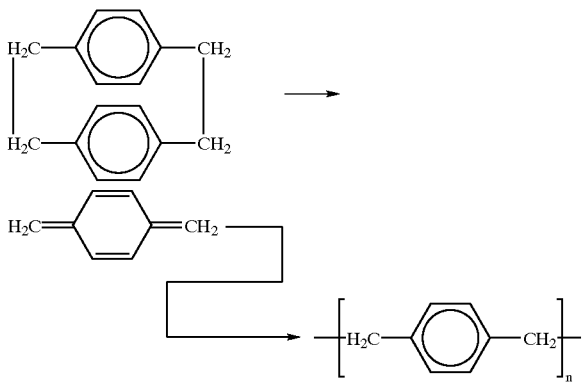

Parylene films (see e.g., U.S. Pat. No. 4,500,562) are well known in the electronic arts and are typically employed due to their ability to conform to items with varied geometries and withstand environmental conditions. For example, they have been used to protect electronic devices, sensors and batteries from adverse environmental conditions (see U.S. Pat. Nos. 6,138,349, 3,676,754 and 5,561,004 respectively). Parylene films have also been employed to insulate wire leads to prevent short-circuits when the leads are physically deformed (see U.S. Pat. No. 5,656,830), to form internal dielectric layers in capacitors embedded in printed circuit boards (U.S. Pat. No. 6,068,782) and as a portion of the internal dielectric layer of discrete capacitors (U.S. Pat. Nos. 3,333,169 and 3,397,085). One useful way to form these films is via vapor deposition (see e.g., U.S. Pat. Nos. 5,534,068, 5,536,319, 5,536,321, 5,536,322).

It is desirable for a ceramic chip capacitor, which will be employed as a safety capacitor, to be as small as possible yet able to withstand high voltage levels. Typically such parts are certified to industry or international standards to ensure reliability. These standards define, among other things, the voltage level that a capacitor of a given physical size must be able to withstand. For example, one such standard defines a ceramic chip capacitor measuring 0.18 inches in length able to withstand 2700 VDC and another defines a ceramic chip capacitor measuring 0.22 inches in length able to withstand 5000 VDC.

SUMMARY OF THE INVENTION

The present invention is directed to a surface flashover resistant multilayer ceramic capacitor. The capacitor has a plurality of layers of dielectric material and a plurality of electrodes disposed between the layers of dielectric material. End caps are located at either end of the capacitor and are connected to one or more of the internal electrodes. A coating comprising one or more insulative layers is applied to the outer surface of the capacitor and selected portions of the coating are subsequently removed. The coating of insulative layer comprises a polymer, and specifically a poly-para-xylylene. Preferably, the insulative coating is applied through a vapor deposition process. The selected portions of the insulating layer are removed preferably by laser ablation.

BRIEF DESCRIPTION OF THE DRAWINGS

FIG. 1A is a cross sectional view of a coated capacitor in accord with one embodiment of the present invention.

FIG. 1B is a cross sectional view of a coated capacitor in accord with an alternative embodiment of the present invention.

FIG. 1C is a cross sectional view of a coated capacitor in accord with another alternative embodiment of the present invention.

FIG. 2 is an exemplary process by which the capacitors of FIGS. 1A–1C are formed in accord with one embodiment of the present invention.

DETAILED DESCRIPTION OF THE INVENTION

The capacitors of the present invention are shown in FIGS. 1A–1C which illustrates three cross-sectional views of a coated multilayer ceramic capacitor according to the present invention. The capacitor comprises a body, the body further comprising a plurality of layers of dielectric material 10 and a plurality of internal electrodes 11. The capacitor further comprises a pair of conductive end caps 12 placed at opposite ends of the body with each end cap electrically connected to one or more of the internal electrodes. The capacitor further comprises an insulative coating 13.

The dielectric material 10 may be any suitable material such as mica, glass, alumina, titania, barium titanate, a formulated ceramic or other material having dielectric properties. Though capacitors that contain dielectric materials formed from these substances derive benefit from the application of an insulative coating material, more benefit may be realized by devices that have exposed ceramic dielectric materials and closely spaced conductive terminals. Prior to the application of the insulative coating according as described below, uncoated ceramic chip capacitors are prone to the surface flashover phenomenon described above. An insulative coating layer covering the body of the capacitor or the body and selected portions of the conductive end caps enhances the capacitor's ability to tolerate applied voltages. Generally, a capacitor having an insulative coating will be able to withstand higher voltage levels without experiencing surface flashover than an otherwise identical capacitor without an insulative coating.

The internal electrodes 11 and conductive end caps 12 and 14 may be formed of any suitable material but will typically be formed of a conductive metal. For example, a silver and palladium alloy is commonly used to form both the internal electrodes 11 and the conductive end caps 12 and 14. The internal electrodes 11 are typically formed by a screen printing process in which the conductive material is applied to a ceramic layer in a manner that will allow its electrical connection to only one end caps 12 or 14. An additional ceramic layer is applied above the screen printed layer and the process is repeated as many times as desired to with the capacitance of the resulting device being proportional to the number of layers. The sheets of layered conductive and ceramic material are then cut into individual pieces that comprise the body of the capacitor. Opposite ends of the body are then dipped into a conductive thick film paste to form the conductive end caps 12 and 14.

In one embodiment of the present invention a primer 18 (FIG. 2) is applied to the entire outer surface of the body of the capacitor and selected portions of the conductive end caps 12 and 14. The primer aids in the deposition insulative coating 13 later applied to the outer surface of the capacitor. A number of suitable primers are known in the art. For example, a primer from a group of chemicals collectively known as silane will aid in the deposition of certain polymers. One embodiment of the present invention contemplates dipping 19 (FIG. 2) the capacitor bodies in such a primer before applying the insulative coating 13.

The present invention includes an insulative coating 13 applied to the body of the capacitor and selected portions of the conductive end caps 12 and 14. In one embodiment of, the insulative coating 13 is comprised of a material chosen from the group of materials collectively referred to by the trade name parylene. Parylene coating materials are commercially available as dimers and include parylene N (polyparaxylylene), parylene C (monochloropolyparaxylylene) and parylene D (dichloropolyparaxylylene). Each of these materials is suitable for use in the coating 13 of the present invention. The first embodiment of the present invention employed parylene C as the coating material.

As shown in FIG. 2, application of the coating begins with the optional step of applying 19 a primer to the entire outer surface of the capacitor. The remainder of the insulative coating is typically applied by a vapor deposition method such as shown in FIG. 2. According to the first step of the vapor deposition process, an insulative coating material, for example the parylene dimer 20, is vaporized by the vaporizer 21. In the case of a parylene dimer, the vaporization will typically occur at about 150 degrees C. This is followed by quantitative cleavage of the dimer at about 680 degrees C. in the pyrolytic chamber 23 to yield the stable monomeric diradical, para-xylylene 22. The monomer then enters a roughly room temperature deposition chamber 25 where it simultaneously adsorbs and polymerizes on the capacitor forming a parylene polymer 24. The parts typically remain in the deposition chamber until a coating 13 of a suitable thickness has formed on the outer surface of each part. Deposition via this process is advantageous in that the capacitor is not placed under thermal stress as it never rises more than a few degrees above ambient.

Next, selected portions of the insulative coating 13 are removed. In one embodiment of the present invention, selected portions of the coating 13 are removed by laser ablation 27 to expose a.portion (FIG. 1B) or all (FIG. 1C) of the conductive end caps following the vapor deposition of the insulative coating, Coated capacitors are fed from a vibratory bowl 28 onto a sheet 30 where they are held in a vertical position. The sheet moves beneath a stationary laser 32 which ablates selected portions of the coating 13 from the exposed end cap 12 or 14. The capacitors are then reoriented in such a manner that the previously unexposed end cap 12 or 14 is now exposed. Selected portions of the conductive coating are then removed from the newly exposed conductive end cap.

Although the present invention is described and illustrated with respect to the embodiments and method described herein, it is to be understood that the invention is not to be limited thereto since changes and modifications can be made without departing from the scope of the invention as hereinafter claimed.

What is claimed is:

1. A method for making a surface flashover resistant capacitor comprising:

forming an insulative coating on an outer surface of the capacitor, the capacitor comprising one or more dielectric layers, a plurality of internal electrodes disposed among the dielectric layers, a pair of conductive terminals with each conductive terminal connected to one or more internal electrodes; and selectively removing portions of the insulative coating from the conductive terminals.

2. The method of claim 1 wherein forming an insulative coating comprises vapor deposition of a substance.

3. The method of claim 2 wherein the substance comprises a polymer.

4. The method of claim 3 wherein the polymer comprises para-poly-xylylene.

5. A method for making a surface flashover resistant capacitor comprising:

applying a primer layer to an outer surface of the capacitor, the capacitor comprising one or more dielectric layers, a plurality of internal electrodes disposed among the dielectric layers, a plurality of conductive end caps with each conductive end cap connected to one or more internal electrodes;

forming an insulative coating on the primer layer; and selectively removing portions of the insulative coating and primer layer from the conductive terminals.

6. The method of claim 5 wherein the coating is formed by vapor deposition.

7. The method of claim 5 wherein selectively removing portions of the insulative coating and primer layer comprises laser ablation of the selected portions.

8. The method of claim 5 wherein forming an insulative coating comprises vapor deposition of a substance.

9. The method of claim 8 wherein the substance comprises a polymer.

10. The method of claim 9 wherein the polymer comprises para-poly-xylylene.

* * * * *